US009814962B2

(12) United States Patent
Zhang

(10) Patent No.: US 9,814,962 B2
(45) Date of Patent: Nov. 14, 2017

(54) REMOTE CONTROL ELECTRIC SHOES

(71) Applicant: JINHUA FEIREN TECHNOLOGY CO., LTD, Jinhua (CN)

(72) Inventor: Xiaojian Zhang, Pingxiang (CN)

(73) Assignee: JINHUA FEIREN TECHNOLOGY CO., LTD, Jinhua (CN)

( * ) Notice: Subject to any disclaimer, the term of this patent is extended or adjusted under 35 U.S.C. 154(b) by 15 days.

(21) Appl. No.: 15/090,860

(22) Filed: Apr. 5, 2016

(65) Prior Publication Data

US 2017/0182397 A1 Jun. 29, 2017

(30) Foreign Application Priority Data

Dec. 28, 2015 (CN) .......................... 2015-10992329

(51) Int. Cl.
*A63C 17/12* (2006.01)
*G05D 1/00* (2006.01)
*A63C 17/00* (2006.01)
*A63C 17/06* (2006.01)

(52) U.S. Cl.
CPC ............ *A63C 17/12* (2013.01); *G05D 1/0011* (2013.01); *A63C 17/0086* (2013.01); *A63C 17/06* (2013.01); *A63C 2203/12* (2013.01); *A63C 2203/22* (2013.01)

(58) Field of Classification Search
CPC . A63C 17/12; A63C 2203/12; A63C 2203/22; A43B 3/0005
See application file for complete search history.

(56) References Cited

U.S. PATENT DOCUMENTS

| | | | | |
|---|---|---|---|---|
| 5,236,058 A * | 8/1993 | Yamet | ................ | A63C 17/12 180/181 |
| 5,797,466 A * | 8/1998 | Gendle | ................ | A63C 17/265 180/181 |
| 6,428,050 B1* | 8/2002 | Brandley | ................ | A63C 17/12 280/11.19 |
| 7,204,330 B1* | 4/2007 | Lauren | ................ | A63C 17/12 180/181 |
| 2004/0159022 A1* | 8/2004 | Winford | ................ | A43B 1/0027 36/136 |
| 2004/0231903 A1* | 11/2004 | Shayan | ................ | A63C 5/08 180/180 |
| 2007/0164521 A1* | 7/2007 | Robinson | ............ | A43B 3/0005 280/11.19 |
| 2013/0158759 A1* | 6/2013 | Oh | ......................... | A63C 17/12 701/22 |

* cited by examiner

*Primary Examiner* — Bryan Evans
(74) *Attorney, Agent, or Firm* — Anova Law Group, PLLC

(57) ABSTRACT

The present invention provides a remote control electric shoes. The electric shoes comprises shoes bodies and a remote control. A user can use the remote control to realize starting/stopping of advancing of the shoes bodies, and to set and adjust the advancing speed of the shoes bodies. Moreover, the electric shoes also has a buckling device for braking. The user presses the buckling device to stop advancing of the shoes bodies. Therefore, the user can conveniently control advancing and stopping of the shoes bodies with the remote control, and thus the operation is convenient. The remote control electric shoes is simple, convenient and easy to use and has wide application prospects.

6 Claims, 2 Drawing Sheets

REMOTE CONTROL ELECTRIC SHOES

BACKGROUND OF THE INVENTION

Technical Field

The present invention relates to a remote control electric shoe and belongs to the field of traveling and entertainment.

Description of Related Art

An electric shoe is generally made by modifying a common roller skate. A battery, a brush motor, and a brush motor controller are installed on the roller skate, and a speed adjusting handle of an electro-car or an electric scooter is used for controlling the operation. However, existing electric shoes often cannot realize wireless remote control operation, and it is inconvenient for user operation.

BRIEF SUMMARY OF THE INVENTION

In order to solve the above-mentioned technical problem, the present invention provides a remote control electric shoe. The electric shoe includes shoe bodies and a remote control. A user can use the remote control to realize starting/stopping of advancing of the shoe bodies, and to set and adjust the advancing speed of the shoe bodies. Moreover, the electric shoe also has a buckling device for braking. The user presses the buckling device to stop advancing of the shoe bodies. Therefore, the user can conveniently control advancing and stopping of the shoe bodies with the remote control, and thus the operation is convenient. The remote control electric shoe is simple, convenient and easy to use and has wide application prospects.

In order to achieve the above-mentioned purpose, the technical solution of the present invention is as follows.

The present invention provides a remote control electric shoe, including a remote control and two shoe bodies wirelessly connected with the remote control. Each shoe body consists of non-take-off shoes and a car body (Aluminum alloy frame) fixed on the bottom of the non-take-off shoes; the car body (alloy frame) is powered by a lithium battery inside the frame; a front wheel and a back wheel are fixedly disposed on the bottom of the car body (frame) front and back; each shoe body has a second processor system. At least one of the two shoes bodies has a brushless hub motor connected with the second processor system; the brushless hub motor provides power for the front wheel and/or the back wheel.

The remote control consists of a grip and a manipulating head; a starting/stopping switch is disposed on one side of the grip; a buckling device is disposed in front of and below the manipulating head; a speed setting knob and a Bluetooth speaker volume adjusting knob are disposed on an operating surface above the manipulating head; a first processor system is further disposed inside the remote control; the starting/stopping switch, the speed setting knob, the Bluetooth speaker volume adjusting knob and a loudspeaker are connected with the first processor system.

When the user turns on the starting/stopping switch, the first processor system acquires a starting signal and sends a start running command to the shoes bodies, and the second processor system controls the brushless hub motor to rotate; when the user turns off the starting/stopping switch, the first processor system acquires a stopping signal and sends to the shoes bodies, and the second processor system controls the brushless hub motor to stop rotating.

When the user places the buckling device in an advancing position, the first processor system acquires an advancing signal and sends to the shoes bodies, and the second processor system controls the brushless hub motor to rotate.

When the user places the buckling device in a middle neutral position, the first processor system acquires a gliding signal and sends to the shoes bodies, and the second processor system stops power supply to the brushless hub motor.

When the user places the buckling device in a front braking position, the first processor system acquires a stopping signal and sends to the shoes bodies, and the second processor system controls the brushless hub motor to stop rotating.

When the user uses the speed setting knob to set the speed, the first processor system acquires a speed value signal and sends to the shoes bodies, and the second processor system controls the brushless hub motor to rotate according to a speed indicated by the speed value.

When the user uses the Bluetooth speaker volume adjusting knob to increase the volume, the first processor system acquires a volume increasing signal and sends to the first processor system, and the first processor system increases the volume of the loudspeaker; and when the user uses the Bluetooth speaker volume adjusting knob to decrease the volume, the first processor system acquires a volume decreasing signal and sends to the first processor system, and the first processor system decreases the volume of the loudspeaker.

Preferably, a remote control power indicator is further disposed on the operating surface above the manipulating head in the remote control and is connected with the first processor system for displaying the power of the battery inside the remote control. A shoe body power indicator connected with the second processor system is further disposed in each shoe body for displaying the power of the lithium battery inside the car body (aluminum alloy frame).

Preferably, a loudspeaker button is further disposed on the operating surface above the manipulating head in the remote control and is connected with the first processor system. When the user presses the loudspeaker button, the first processor system acquires a whistle signal and sends to the loudspeaker to whistle.

Preferably, the remote control is connected with the two shoes bodies through Bluetooth.

Preferably, only one shoe body has a brushless hub motor connected with the second processor system; the brushless hub motor provides power for the back wheel.

Preferably, the remote control further includes a mobile smart device connecting module for connecting with a mobile smart device. The user can control the running of the shoe bodies, read and set the data of the shoe bodies through a mobile smart device. The user further links the mobile smart device through the mobile smart device connecting module, and shares the map position and data information.

Preferably, the remote control further includes a GPS system and a map database. The GPS system is used for acquiring real time position information of the user. The map database is used for storing information of all the roads for the user. Moreover, the two shoes bodies include a left shoe body and a right shoe body. The GPS system sends the position information of the user to the first processor system. The first processor system acquires the road information around the user according to the position information;

When the first processor system determines that the user needs to decelerate according to the road information around the user, it sends a deceleration command to the left and right shoe bodies, the second processor system in the left and right shoe bodies controls the brushless hub motor to decelerate.

When the first processor system determines that the user needs to turn right according to the road information around the user, it sends an acceleration command to the left shoe body, the second processor system in the left shoe body controls the brushless hub motor to accelerate.

When the first processor system determines that the user needs to turn left according to the road information around the user, it sends an acceleration command to the right shoe body, the second processor system in the right shoe body controls the brushless hub motor to accelerate.

The present invention has the following beneficial effects. The present invention provides a remote control electric shoes. The electric shoes includes shoes bodies and a remote control. A user can use the remote control to realize starting/stopping of advancing of the shoes bodies, and to set and adjust the advancing speed of the shoes bodies. Moreover, the electric shoes also has a buckling device for braking. The user presses the buckling device to stop advancing of the shoes bodies. Therefore, the user can conveniently control advancing and stopping of the shoes bodies with the remote control, and thus the operation is convenient. The remote control electric shoes is simple, convenient and easy to use and has wide application prospects.

Figure 1:
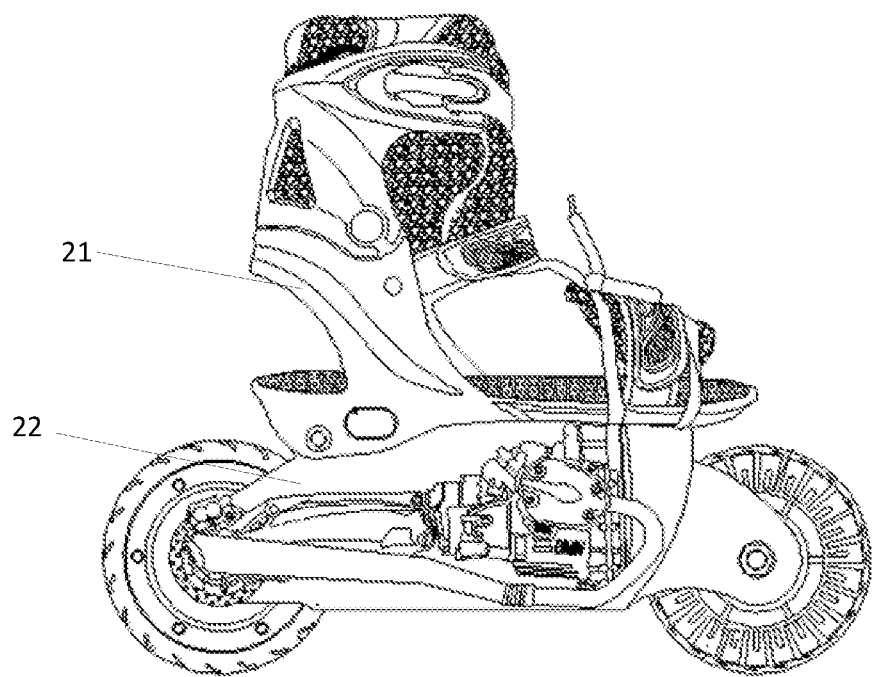
FIG. 1 is a front view of a shoe body of a remote control electric shoe provided in the present invention.

In the drawings, various components are exemplarily labeled as follows: 1. Remote control; 11. Grip; 12. Buckling device; 13. Starting/stopping switch; 14. Manipulating head; 141. Speed setting knob; 142. Loudspeaker button; 143. Bluetooth speaker volume adjusting knob; 144. Remote control power indicator; 15. First processor system; 16. GPS system; 17. Map database; 18. Loudspeaker; 19. Mobile smart device connecting module; 2. Shoe body; 21. Second processor system; 22. car body (aluminum alloy frame); 24. Brushless hub motor; 23. Shoe body power indicator.

DETAILED DESCRIPTION OF THE INVENTION

The present invention is further illustrated below in detail in conjunction with the detailed description.

Figure 2:
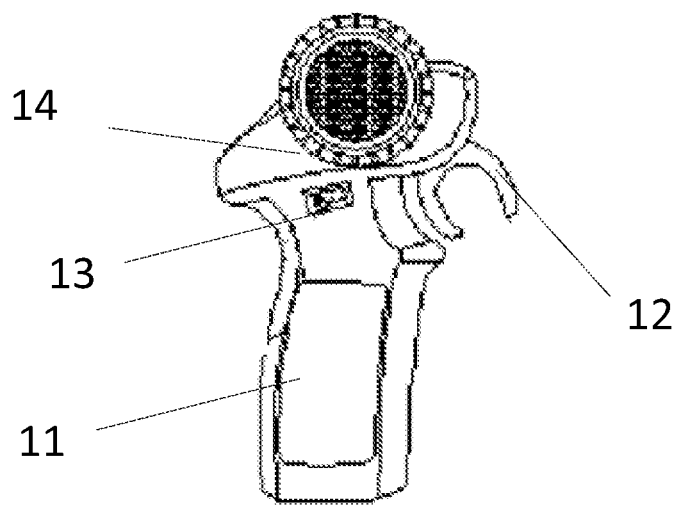
FIG. 2 is a front view of a remote control of the remote control electric shoe provided in the present invention.
Figure 3:
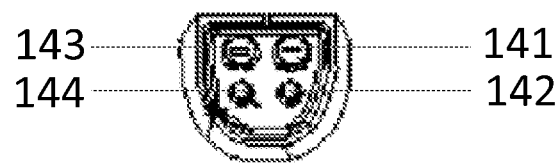
FIG. 3 is a front view of a manipulating head of the remote control of the remote control electric shoe provided in the present invention.
Figure 4:
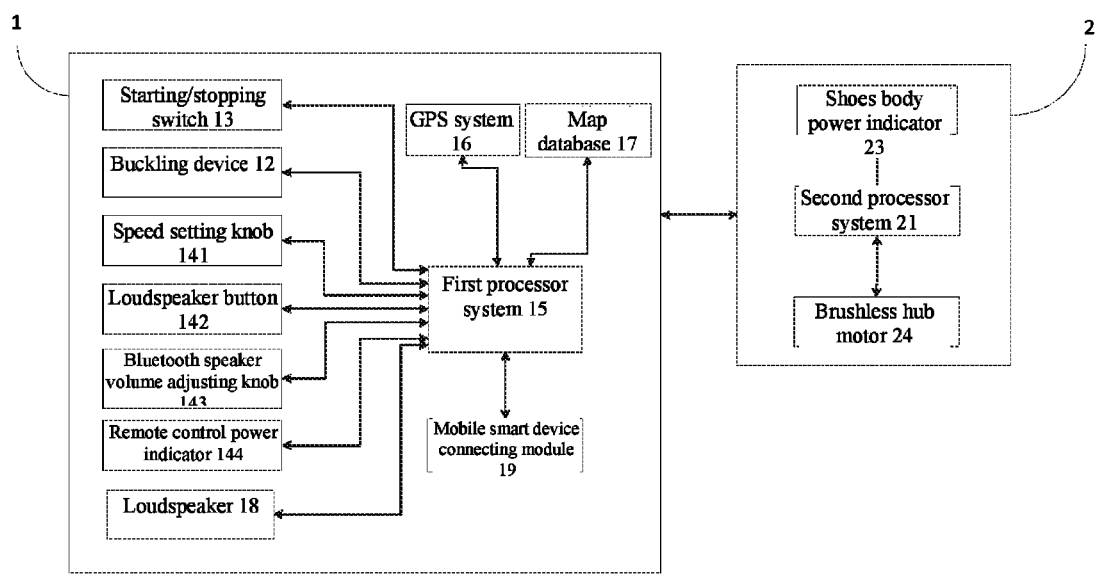
FIG. 4 is a system architecture diagram of the remote control electric shoe provided in the present invention.

The present invention provides a remote control electric shoe, as shown in FIGS. 1, 2, 3 and 4, including a remote control 1 and two shoe bodies 2 wirelessly connected with the remote control.

Each shoe body 2 consists of a non-take-off shoe 21 and a car body (aluminum alloy frame) 22 fixed on the bottom of the non-take-off shoe 21 (i.e., shoe 21 cannot be taken off from the car body 22). The aluminum alloy frame 22 is powered by a lithium battery inside the alloy frame 22; and a front wheel and a back wheel are fixedly disposed on the bottom of the alloy frame front and back. Each shoe body 2 has a second processor system.

At least one of the two shoe bodies 2 has a brushless hub motor 24 connected with the second processor system 21; and the brushless hub motor 24 provides power for the front wheel and/or the back wheel.

The two shoe bodies include a left shoe body and a right shoe body, each can satisfy the requirement of the above-mentioned functions. Alternatively, the non-take-off shoe further includes a non-take-off shoe length adjusting button.

The remote control 1 consists of a grip 11 and a manipulating head 14. A starting/stopping switch 13 is disposed on one side of the grip 11; and a buckling device 12 is disposed in front of and below the manipulating head 14. Further, a speed setting knob 141 and a Bluetooth speaker volume adjusting knob 143 are disposed on an operating surface above the manipulating head 14. A first processor system 15 is further disposed inside the remote control 1. The starting/stopping switch 13, the speed setting knob 141, the Bluetooth speaker volume adjusting knob 143 and a loudspeaker 18 are connected with the first processor system 15.

When the user turns on the starting/stopping switch 13, the first processor system 15 acquires a starting signal and sends a start running command to the shoe bodies 2, and the second processor system 21 controls the brushless hub motor 24 to rotate. When the user turns off the starting/stopping switch 13, the first processor system 15 acquires a stopping signal and sends to the shoe bodies 2, and the second processor system 21 controls the brushless hub motor 24 to stop rotating.

When the user places the buckling device 12 in an advancing position, the first processor system 15 acquires an advancing signal and sends to the shoe bodies 2, and the second processor system 21 controls the brushless hub motor 24 to rotate.

When the user places the buckling device 12 in a middle neutral position, the first processor system 15 acquires a gliding signal and sends to the shoe bodies 2, and the second processor system 21 stops power supply to the brushless hub motor 24.

When the user places the buckling device 12 in a front braking position, the first processor system 15 acquires a stopping signal and sends to the shoe bodies 2, and the second processor system 21 controls the brushless hub motor 24 to stop rotating.

When the user uses the speed setting knob 141 to set the speed, the first processor system 15 acquires a speed value signal and sends to the shoe bodies 2, and the second processor system 21 controls the brushless hub motor 24 to rotate according to a speed indicated by the speed value.

When the user uses the Bluetooth speaker volume adjusting knob 143 to increase the volume, the first processor system 15 acquires a volume increasing signal and sends to the first processor system 15, and the first processor system 15 increases the volume of the loudspeaker 18; and when the user uses the Bluetooth speaker volume adjusting knob 143 to decrease the volume, the first processor system 15 acquires a volume decreasing signal and sends to the first processor system 15, and the first processor system 15 decreases the volume of the loudspeaker 18.

Accordingly, the present invention provides a remote control electric shoe. The electric shoe includes shoe bodies and a remote control. A user can use the remote control to realize starting/stopping of advancing of the shoe bodies, and to set and adjust the advancing speed of the shoe bodies. Moreover, the electric shoe also has a buckling device for braking. The user presses the buckling device to stop advancing of the shoe bodies. Therefore, the user can conveniently control advancing and stopping of the shoe bodies with the remote control, and thus the operation is convenient. The remote control electric shoe is simple, convenient and easy to use and has wide application prospects.

Preferably, a remote control power indicator 144 is further disposed on the operating surface above the manipulating head 14 in the remote control 1 and is connected with the first processor system 15 for displaying the power of the battery inside the remote control 1.

A shoe body power indicator 23 connected with the second processor system 21 is further disposed in each shoe body 2 for displaying the power of the lithium battery inside the aluminum alloy frame.

The remote control power indicator can be used for reminding the power of the battery in the remote control for the user, and the shoe power indicator can be used for reminding the power of the lithium battery in the shoe body for the user, so that the user can charge the shoe in time.

Preferably, a loudspeaker button 142 is further disposed on the operating surface above the manipulating head 14 in the remote control 1 and is connected with the first processor system 15. When the user presses the loudspeaker button 142, the first processor system 15 acquires a whistle signal and sends to the loudspeaker 18 to whistle. Whistling can remind the pedestrians, improving safety of the wearer and the pedestrians.

Preferably, the remote control 1 is connected with the two shoe bodies 2 through Bluetooth.

Preferably, only one shoe body 2 has a brushless hub motor 24 connected with the second processor system 21; and the brushless hub motor 24 provides power for the back wheel. Thus, only one shoe body has a brushless hub motor, which saves cost, and at the same time does not affect the usage of the user.

Preferably, the remote control 1 further comprises a mobile smart device connecting module 19 for connecting with a mobile smart device. The user can control the running of the shoe bodies 2, read and set the data of the shoe bodies 2 through a mobile smart device. The user further links the mobile smart device through the mobile smart device connecting module 19, and shares the map position and data information.

Preferably, the remote control 1 further includes a GPS system 16 and a map database 17. The GPS system 16 is used for acquiring real time position information of the user. The map database 17 is used for storing information of all the roads for the user. Moreover, the two shoe bodies 2 include a left shoe body and a right shoe body.

The GPS system 16 sends the position information of the user to the first processor system 15. The first processor system 15 acquires the road information around the user according to the position information.

When the first processor system 15 determines that the user needs to decelerate according to the road information around the user, it sends a deceleration command to the left and right shoe bodies, the second processor system 21 in the left and right shoe bodies controls the brushless hub motor 24 to decelerate.

When the first processor system 15 determines that the user needs to turn right according to the road information around the user, it sends an acceleration command to the left shoe body, the second processor system 21 in the left shoe body controls the brushless hub motor 24 to accelerate.

When the first processor system 15 determines that the user needs to turn left according to the road information around the user, it sends an acceleration command to the right shoe body, the second processor system 21 in the right shoe body controls the brushless hub motor 24 to accelerate.

When the user glides in the street wearing the remote control electric shoe, the user might neglect the traffic condition in the surroundings because of other interference and might be at risk. The remote control electric shoe acquires the geographic position of the user in time and stores the surrounding road information, e.g., the front is a crossroad, it needs to slow down; the front is a corner, the remote control electric shoe will automatically turn. Therefore, the electric shoe brings convenience for the usage of the user and improves the safety of the user.

Obviously, the above-mentioned embodiments are simply examples for clearly illustrating but not limiting the implementation. For those skilled in the art, variations or modifications in other different forms can also be made on the basis of the above-mentioned illustration. Not all implementations are described herein. It is apparent that the extended variations or modifications fall within the protection scope of the present invention.

What is claimed is:

1. A remote control electric shoes, comprising:
a remote control having a first processor system; and
two shoes bodies wirelessly connected with the remote control, wherein:
each shoe body consists of a non-take-off shoe and a car body fixed on the bottom of the shoes; the car body is powered by a lithium battery inside the car body; a front wheel and a back wheel are fixedly disposed on the bottom of an alloy frame front and back for each shoe body; and each shoe body has a second processor system;
at least one of the two shoe bodies has a brushless hub motor connected with the second processor system; the brushless hub motor provides power for the front wheel and/or the back wheel;
the remote control consists of a grip and a manipulating head; a starting/stopping switch is disposed on one side of the grip; a buckling device is disposed in front of and below the manipulating head; a speed setting knob and a Bluetooth speaker volume adjusting knob are disposed on an operating surface above the manipulating head; the first processor system is further disposed inside the remote control; the starting/stopping switch, the speed setting knob, the Bluetooth speaker volume adjusting knob and a loudspeaker are connected with the first processor system;
when the user turns on the starting/stopping switch, the first processor system acquires a starting signal and sends a start running command to the shoes bodies, and the second processor system controls the brushless hub motor to rotate; when the user turns off the starting/stopping switch, the first processor system acquires a stopping signal and sends to the shoes bodies, and the second processor system controls the brushless hub motor to stop rotating;
when the user places the buckling device in an advancing position, the first processor system acquires an advancing signal and sends to the shoes bodies, and the second processor system controls the brushless hub motor to rotate;
when the user places the buckling device in a middle neutral position, the first processor system acquires a gliding signal and sends to the shoe bodies, and the second processor system stops power supply to the brushless hub motor;

when the user places the buckling device in a front braking position, the first processor system acquires a stopping signal and sends to the shoe bodies, and the second processor system controls the brushless hub motor to stop rotating;

when the user uses the speed setting knob to set the speed, the first processor system acquires a speed value signal and sends to the shoes bodies, and the second processor system controls the brushless hub motor to rotate according to a speed indicated by the speed value; and when the user uses the Bluetooth speaker volume adjusting knob to increase the volume, the first processor system acquires a volume increasing signal and sends to the first processor system, and the first processor system increases the volume of the loudspeaker; and when the user uses the Bluetooth speaker volume adjusting knob to decrease the volume, the first processor system acquires a volume decreasing signal and sends to the first processor system, and the first processor system decreases the volume of the loudspeaker.

2. The remote control electric shoe according to claim 1, wherein:

a remote control power indicator is further disposed on the operating surface above the manipulating head in the remote control and is connected with the first processor system for displaying the power of the battery inside the remote control;

a shoe body power indicator connected with the second processor system is further disposed in each shoe body for displaying the power of the lithium battery inside the aluminum alloy frame.

3. The remote control electric shoe according to claim 2, wherein:

a loudspeaker button is further disposed on the operating surface above the manipulating head in the remote control and is connected with the first processor system;

when the user presses the loudspeaker button, the first processor system acquires a whistle signal and sends to the loudspeaker to whistle.

4. The remote control electric shoe according to claim 3, wherein:

the remote control is connected with the two shoes bodies through Bluetooth.

5. The remote control electric shoe according to claim 4, wherein:

only one shoe body has a brushless hub motor connected with the second processor system; and the brushless hub motor provides power for the back wheel.

6. The remote control electric shoe according to claim 1, wherein:

the remote control further comprises a mobile smart device connecting module for connecting with a mobile smart device; the user can control the running of the shoe bodies, read and set the data of the shoe bodies through a mobile smart device; and the user further links the mobile smart device through the mobile smart device connecting module, and shares the map position and data information.

* * * * *